US010541968B2

(12) United States Patent
Bladel et al.

(10) Patent No.: US 10,541,968 B2
(45) Date of Patent: Jan. 21, 2020

(54) GENERATING, DISPLAYING AND REGISTERING A SUGGESTED DOMAIN NAME DERIVED FROM A DOMAIN NAME ALREADY REGISTERED TO A REGISTRANT

(71) Applicant: Go Daddy Operating Company, LLC, Scottsdale, AZ (US)

(72) Inventors: James Bladel, LeClaire, IA (US); Richard Merdinger, Iowa City, IA (US); Kevin Kreuser, Scottsdale, AZ (US); Peter Osmond, Ash Vale (GB)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 80 days.

(21) Appl. No.: 15/935,736

(22) Filed: Mar. 26, 2018

(65) Prior Publication Data

US 2019/0297052 A1    Sep. 26, 2019

(51) Int. Cl.
*G06Q 30/06* (2012.01)
*H04L 29/12* (2006.01)
*H04L 12/24* (2006.01)
*H04L 29/08* (2006.01)
*G06F 3/0482* (2013.01)
*G06F 17/27* (2006.01)

(52) U.S. Cl.
CPC ...... *H04L 61/1511* (2013.01); *G06Q 30/0641* (2013.01); *H04L 41/22* (2013.01); *H04L 67/306* (2013.01); *G06F 3/0482* (2013.01); *G06F 17/2795* (2013.01)

(58) Field of Classification Search
CPC ... H04L 61/1511; H04L 67/306; H04L 41/22; G06Q 30/0641; G06F 17/2795; G06F 3/0482
See application file for complete search history.

(56) References Cited

U.S. PATENT DOCUMENTS

| 7,921,035 | B2 * | 4/2011 | Adelman | G06Q 30/0241 |
| | | | | 705/14.4 |
| 9,065,794 | B2 * | 6/2015 | Smith | G06F 17/2795 |
| 9,323,859 | B2 * | 4/2016 | Schonfeld | G06F 16/958 |
| 10,015,134 | B2 * | 7/2018 | Gould | H04L 61/302 |
| 10,140,644 | B1 * | 11/2018 | Kamdar | G06Q 30/0623 |
| 10,345,988 | B2 * | 7/2019 | Kozloski | G06F 3/04812 |

(Continued)

*Primary Examiner* — Philip J Chea
*Assistant Examiner* — Wuji Chen
(74) *Attorney, Agent, or Firm* — Greenberg Traurig, LLP

(57) ABSTRACT

A registrar may authenticate a registrant and allow the registrant to access a registrant customer account. The registrant customer account is private (accessible only by the registrant) and displays domain names and/or settings for the domain names registered to the registrant. The registrant may change domain name settings, such as renewals or DNS, from the registrant customer account. The registrar may generate one or more suggested domain names that are derived from the one or more domain names registered to the registrant. When the registrar detects an interest in a domain name registered to the registrant, the registrar may immediately thereafter display one or more suggested domain names that were derived from that domain name registered to the registrant for registration. If selected by the registrant, the registrar may register the selected suggested domain names to the registrant through a registry.

20 Claims, 7 Drawing Sheets

(56) References Cited

U.S. PATENT DOCUMENTS

| | | | |
|---|---|---|---|
| 10,387,959 B2 * | 8/2019 | Kamdar | G06Q 40/06 |
| 2002/0103820 A1 * | 8/2002 | Cartmell | G06F 17/273 |
| | | | 715/260 |
| 2004/0199608 A1 * | 10/2004 | Rechterman | G06Q 10/10 |
| | | | 709/220 |
| 2006/0101155 A1 | 5/2006 | Damour et al. | |
| 2010/0017754 A1 * | 1/2010 | Cafer | G06F 3/04817 |
| | | | 715/835 |
| 2010/0106731 A1 * | 4/2010 | Cartmell | G06F 17/273 |
| | | | 707/748 |
| 2010/0325128 A1 * | 12/2010 | Adelman | H04L 29/12594 |
| | | | 707/759 |
| 2013/0173497 A1 * | 7/2013 | Gould | H04L 61/302 |
| | | | 705/400 |
| 2015/0058330 A1 * | 2/2015 | Carroll | G06F 16/9535 |
| | | | 707/723 |
| 2015/0106231 A1 * | 4/2015 | Kamdar | G06Q 30/0621 |
| | | | 705/26.35 |
| 2018/0309719 A1 * | 10/2018 | Gould | H04L 61/302 |

* cited by examiner

Webpage 118

Registrar-Name

Username or Customer # 300

John Doe

Password 301

GoDaddyis#1!

FIG. 3

GENERATING, DISPLAYING AND REGISTERING A SUGGESTED DOMAIN NAME DERIVED FROM A DOMAIN NAME ALREADY REGISTERED TO A REGISTRANT

FIELD OF THE INVENTION

The present invention generally relates to the field of generating, displaying and registering a domain name suggested to a registrant. The suggested domain name is derived from a domain name already registered to the registrant. The suggested domain name is displayed to the registrant when the registrant is logged into a registrant customer account and the registrar may detect the registrant has shown an interest in the registered domain name, thus making it likely the registrant may want to register the suggested domain name that is based on the domain name registered to the registrant.

SUMMARY OF THE INVENTION

The present invention provides new methods of generating, displaying and registering a suggested domain name to a registrant while the registrant is accessing the registrant's private registrant customer account. The suggested domain name is based on or is a derivative of an existing domain name already registered to the registrant.

The suggested domain name is displayed to the registrant for registration when the registrant interacts with the registered domain name in the registrant customer account in some manner. As non-limiting examples, the registrant may i) select or hover a curser over the registered domain name or ii) select or hover the curser over an action to be taken regarding the registered domain name (such as renewing or viewing/editing DNS records for the registered domain name).

Hovering is defined as a curser remaining over an item on a webpage for at least some preselected period of time. As non-limiting examples, the preselected period of time may be at least 0.5 seconds, at least one second or at least three seconds. The suggested domain name may be displayed to the registrant even though the registrant has not taken any action that is traditionally required to receive suggested domain names for registration, such as entering a search string or a desired domain name into a search field displayed on a public webpage.

The method for a registrar to register a suggested domain name to a registrant may start by the registrar receiving over a computer network login credentials from the registrant. The login credentials from the registrant may be entered into one or more fields on a webpage designed for receiving login credentials from registrants and/or the login credentials may be biometric measurements. The registrar may compare the login credentials from the registrant to saved login credentials for the registrant customer account in an attempt to authenticate the registrant for access to the registrant customer account.

If the login credentials entered by the registrant match the saved login credentials for the registrant customer account, the registrant is authenticated and the registrant may enter the registrant customer account comprising one or more webpages. If the registrant is not authenticated, the process is terminated and the registrant is not allowed to login to the registrant customer account. Thus, the registrant customer account is private and only for the use of an authenticated registrant and is not accessible to other Internet users or other registrants of the registrar. It should be appreciated that other registrants may have their own registrant customer accounts with webpages that look similar to the webpages of the registrant customer account, but the other registrant customer accounts will have data associated with the other registrants.

The registrant customer account is configured to display to the registrant a plurality of settings for one or more registered domain names registered to the registrant and allow the registrant to modify the plurality of settings for the one or more registered domain names.

The registrar, either before or after the registrant logs/signs into the registrant customer account, may generate one or more suggested domain names that are based on or derived from a domain name registered to the registrant. The registrar may determine whether the one or more suggested domain names are available for registration and upon determining that one or more of the suggested domain names are available for registration the registrar may save the suggested domain name that are available, preferably in a database.

The registrar may detect an interest in the registered domain name by the registrant while the registrant is logged in to the registrant customer account. Any desired method of detecting an interest in a domain name already registered to the registrant may be used. As non-limiting examples, the registrar may detect that i) the registrant selected the registered domain name, selected an option to renew the registered domain name or selected an option to manage the registered domain name or ii) the registrant hovered the curser over the registered domain name, hovered the curser over an option to renew the registered domain name or hovered the curser over an option to manage the registered domain name.

The registrar, triggered solely by the registrar detecting the interest in the registered domain name by the registrant while the registrant is logged into the registrant customer account, may immediately display on a webpage in the registrant customer account the suggested domain names to the registrant as an option for the registrant to register one or more of the suggested domain names.

The registrar may receive from the registrant a selection of one or more suggested domain names displayed on the one or more webpages of the registrant customer account to register one or more of the suggested domain names. The registrar may register the selected suggested domain names to the registrant, wherein the selected suggested domain names are transmitted to a registry, which stores the selected suggested domain names in the WHOIS database.

If the registrant does not select a suggested domain name that was displayed for registration, the registrar may save the suggested domain name in a black list and not display the same suggested domain name to the registrant again, increase the predetermined time period necessary to detect hovering, ask the registrant if the registrant wants suggested domain names while the registrant is signed into the registrant customer account and/or turn off the suggested domain name feature for some predetermined period of time, such as one day.

The above features and advantages of the present invention will be better understood from the following detailed description taken in conjunction with the accompanying drawings.

BRIEF DESCRIPTION OF THE DRAWINGS

FIG. 3 is an example webpage for a registrant to sign in to a registrant customer account. This webpage may be used by a plurality of registrants and the webpage will, if a proper identification is provided, sign in each registrant to that registrant's customer account.

In FIG. 4, a cursor is hovering over the domain name "companyname.com" displayed on the example webpage.

DETAILED DESCRIPTION

Figure 1:
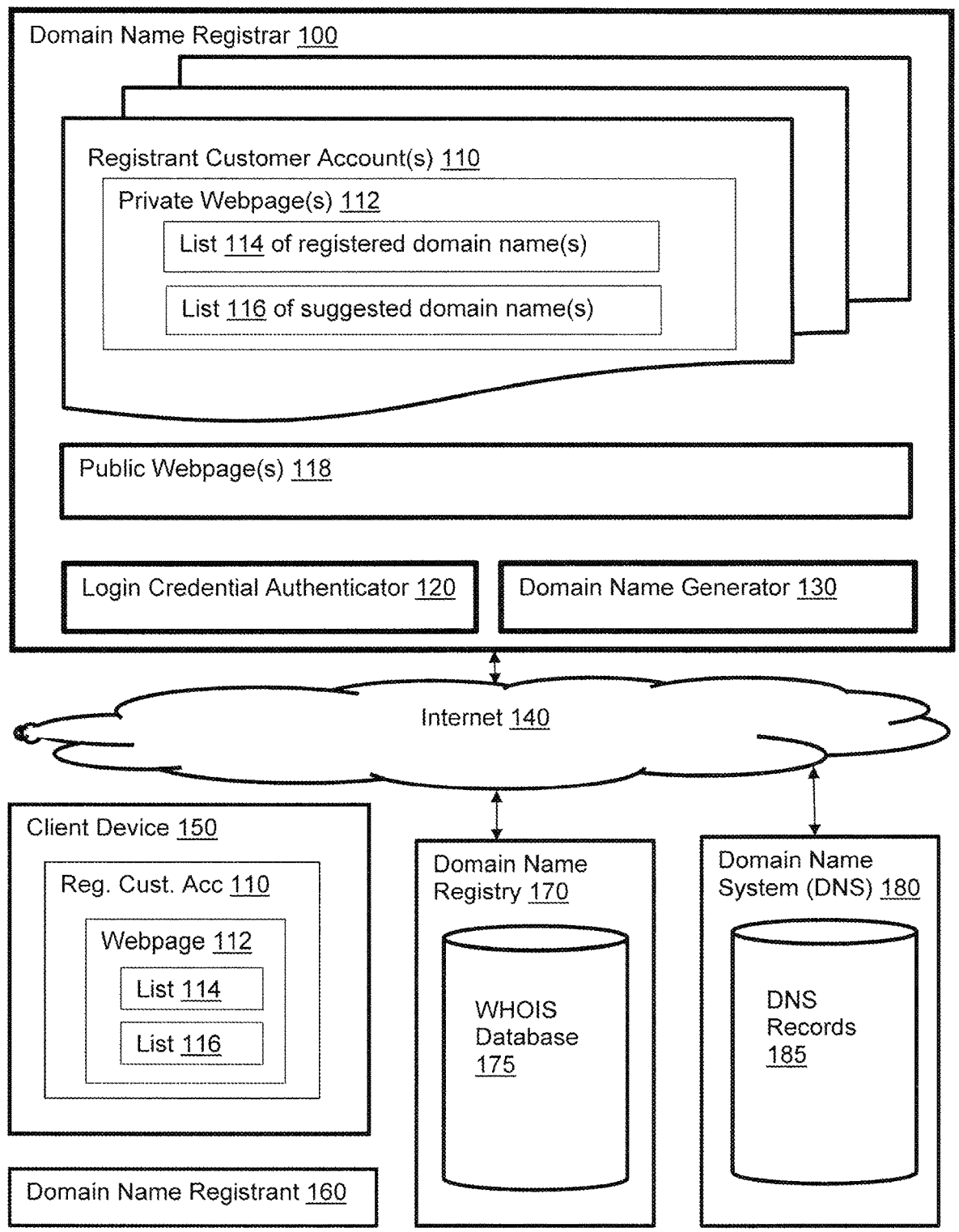
FIG. 1 is a block diagram of an example system that permits a registrar to generate, display and register a domain name (suggested domain name) to a registrant based on a domain name (registered domain name) already registered to the registrant. The suggested domain name is triggered to be displayed to the registrant when the registrant is logged into a registrant customer account and the registrant has taken some action in the registrant customer account related to the registered domain name.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system and FIGS. 2-6 are example webpages (private webpage(s) 112 and public webpage(s) 118) that may be used to practice the present invention. The domain name registrar (registrar 100), domain name registry 170 (registry 170), domain name system (DNS) 180 and Internet 140 comprise one or more computer networks. These computer networks are defined to be special purpose machines that comprise computer hardware, such as one or more computer hardware servers, and are designed to perform specific functions. Specifically, the computer network for the registrar 100 is a special purpose computer network designed to allow customers/registrants 160 to register and manage domain names from registrant customer accounts 110.

The computer network for the registry 170 is a special purpose computer network designed to store all domain names of a particular top-level domain (TLD) that have been registered and store the authoritative information regarding the registered domain names in the WHOIS database 175. The registrar 100 comprises a website having a plurality of webpages 112, 118. FIGS. 2-6 represent specific non-limiting examples of webpages 112, 118 that may be part of the website of the registrar 100. The website is hosted or operated from one or more hardware servers. The servers may be, as a non-limiting example, one or more Dell PowerEdge(s) © rack server(s) although other types of servers or combinations of one or more servers may also be used. The webpages 112, 118 may have one or more display fields as well as one or more data entry fields. The data entry fields allow a registrant 160 to enter data into the field in the webpage 112, 118 from a client device 150 of the registrant 160.

The computer network for the DNS is a special purpose computer network designed to receive domain names from computer browsers and return Internet Protocol (IP) addresses associated with corresponding domain names to browsers running on client devices. The arrows in the figures represent computer networks and/or communication paths between computer networks.

A computer network is a collection of links and nodes (e.g., multiple computers and/or other client devices connected together) arranged so that information may be passed from one part of the computer network to another over multiple links and through various nodes. Examples of computer networks include the Internet 140, the public switched telephone network, the global Telex network, computer networks (e.g., an intranet, an extranet, a local-area network, or a wide-area network), wired networks, and wireless networks.

The Internet 140 is a worldwide network of computers and computer networks arranged to allow the easy and robust exchange of information between computer users on client devices. Billions of people around the world have access to client devices connected to the Internet 140 via Internet Service Providers (ISPs). Content providers place multimedia information (e.g., text, graphics, audio, video, animation, and other forms of data) at specific locations on the Internet 140 referred to as websites. The combination of all the websites and their corresponding webpages 112, 118 on the Internet 140 is generally known as the World Wide Web (WWW) or simply the Web.

For Internet users and businesses alike, the Internet 140 continues to be increasingly valuable. More people use the Web for everyday tasks, from social networking, shopping, banking, and paying bills to consuming media and entertainment. E-commerce is growing, with businesses delivering more services and content across the Internet 140, communicating and collaborating online, and inventing new ways to connect with each other.

Prevalent on the Internet 140 are multimedia websites, some of which may offer and sell goods and services to individuals and organizations. Websites may consist of a single webpage 112, 118, but typically consist of multiple interconnected and related webpages 112, 118. Websites may reside on one or more hardware servers (sometimes geographically separated) and are typically prepared and maintained by a single individual or entity that is usually the registrant 160 of the domain name that points to the website. Menus, links, tabs, etc. may be used to move between different webpages 112, 118 within the website or to move to a different website.

Websites may be created using HyperText Markup Language (HTML) to generate a standard set of tags that define how the webpages 112, 118 for the website are to be displayed. Users of the Internet 140 may access content providers' websites using software known as an Internet browser, such as MICROSOFT INTERNET EXPLORER®, GOOGLE CHROME® or MOZILLA FIREFOX®. After the browser has located the desired webpage 112, 118 (through the use of the DNS or cache memory), the browser requests and receives information from the webpages 112, 118, typically in the form of an HTML document, and then displays the webpages 112, 118 content for the user on the client device 150. The user may send and receive information from the webpages 112, 118 of the website. The user may then also view other webpages 112, 118 at the same website or move to an entirely different website using the browser.

Some registrants 160, typically those that are larger and more sophisticated, may provide their own hardware, software, and connections to the Internet 140 to host their own website(s). But many registrants 160 either do not have the resources available or do not want to create and maintain the infrastructure necessary to host their own websites. To assist such registrants 160, hosting companies exist that offer website hosting services. These hosting providers typically provide the hardware, software, and electronic communication means necessary to connect multiple websites to the Internet 140. A single hosting provider may literally host thousands of websites on one or more hosting servers.

Browsers are able to locate specific websites because each website, resource, and computer on the Internet 140 has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6), is a 128-bit binary number. The standard human readable notation for IPv6 addresses presents the address as eight 16-bit hexadecimal words, each separated by a colon (e.g., 2EDC:BA98:0332:0000:CF8A: 000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet 140 through the use of a URL. The URL may include a Hypertext Transfer Protocol (HTTP) request combined with the website's Internet address, also known as the website's domain name. An example of a URL with a HTTP request and domain name is: http://www.companyname-.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry 170") for maintaining an authoritative source of information for the registered domain names within a TLD and their corresponding IP addresses.

For certain TLDs (e.g., .biz, .info, .name, and .org) the registry 170 is also the authoritative source for contact information related to the domain name and is referred to as a "thick" registry 170. For other TLDs (e.g., .com and .net) only the domain name, registrar identification, and name server information is stored within the registry 170, and a registrar 100 is the authoritative source for the contact information related to the domain name. Such registries are referred to as "thin" registries. Most domain names having a gTLDs are organized through a Shared Registration System (SRS) based on their TLD.

A registrant 160 is hereby defined to be a person or entity that is in the process of registering a domain name or has already registered a domain name. The registrant 160 uses a client device 150, such as, as non-limiting examples, a cell phone, PDA, tablet, laptop computer, or desktop computer to access a website (such as their own website or a website of a domain name registrar 100) via a computer network, such as the Internet 140. The client device 150 is hereby defined to be a machine that comprises computer hardware.

Figure 2:
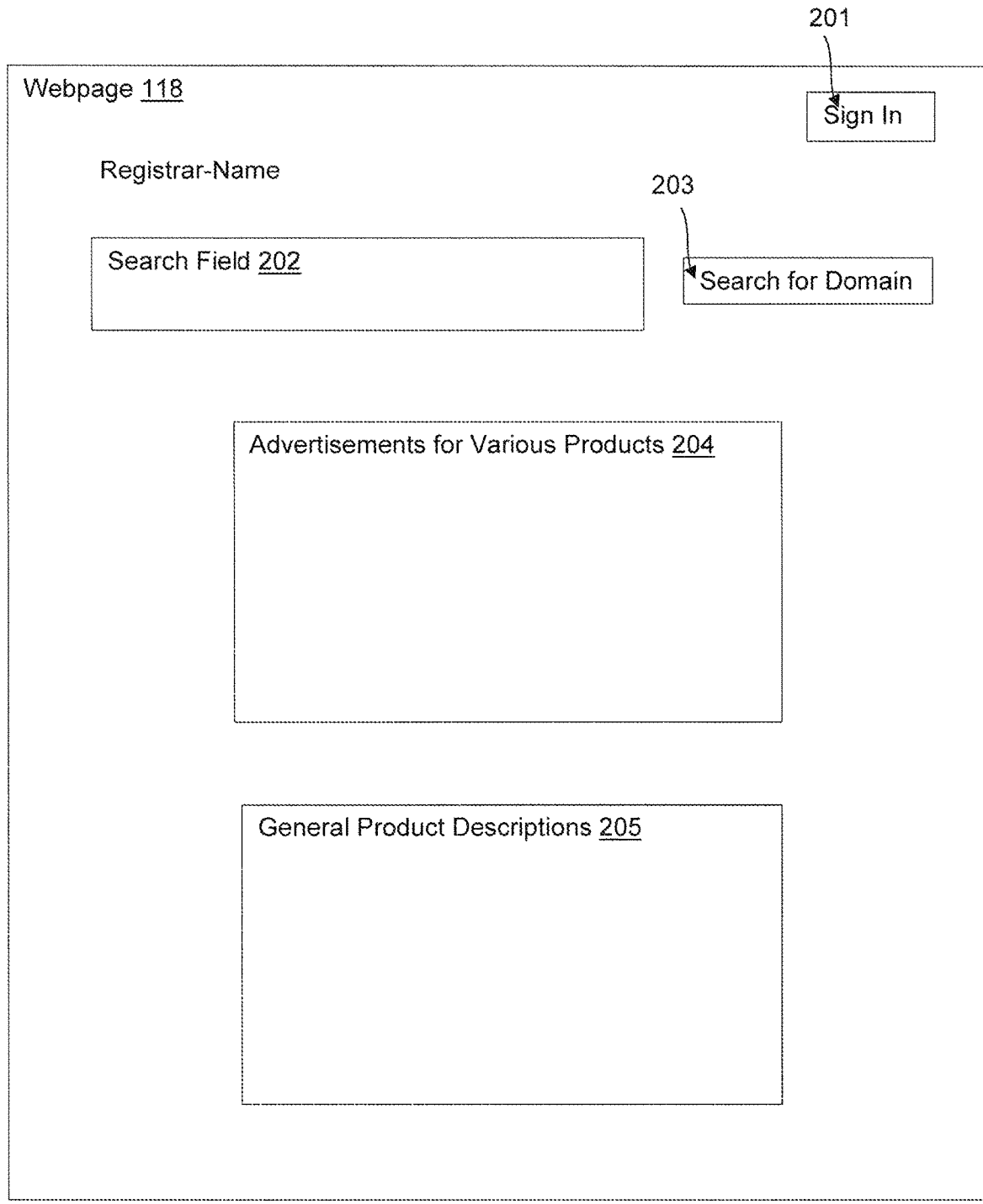
FIG. 2 is an example public webpage in one or more public webpages of a registrar that are accessible by all the registrants of the registrar and all Internet users. The illustrated example public webpage allows a user to enter a search string or a domain name into a field and select a Search for Domain button. The registrar may then display to the user whether the entered domain name is available and/or one or more alternative or suggested domain names based on the entered search string or the entered domain name.

FIG. 2 is an example public webpage 118 in one or more public webpages 112, 118 of a registrar 100 that are accessible by all the registrants/customers 160 of the registrar 100 and all Internet users. It should be appreciated that while some webpages 118 of the registrar 100 are public, the registrar 100 also has webpages 112 that are private. Specifically, each registrant 160 may have a registrant customer account 110 comprising a plurality of webpages 112 that are private, i.e., only accessible, by that registrant 160 once authenticated.

A registrant 160 that wishes to register a domain name will usually want to first determine whether the domain name is available for registration through the use of a webpage supported by a registrar 100. The webpage may be a public webpage 118 available to all Internet visitors, customers and registrants of the registrar 100 or the webpage may be a private webpage 112 available only to a registrant/ customer 160 of the registrar 100. The webpage in FIG. 2 is an example of a public webpage 118 that may be used by all to determine the availability of a domain name. If a registrant 160, for example John Doe, wishes to register the domain name "mycompany.com," John Doe may initially determine whether the desired domain name is available by interfacing with a registrar 100 through the example webpage 118 in FIG. 2.

The registrant 160, using a browser running on the client device 150 of the registrant 160, may contact the registrar 100 website over the Internet 140 and type the desired domain name or a search string into a search field 202 on the website created for this purpose. Upon receiving the request from the registrant 160, the registrar 100 may ascertain whether the request, such as "mycompany.com," has already been registered. The registrar 100 may determine the availability of the domain name by, as a non-limiting example, checking with the registry 170 associated with the TLD for the searched for domain name or by checking with a zone file downloaded from the registry 170. The results of the search may be displayed on the website to thereby notify the potential registrant 160 if the domain name is available. If the domain name is available, the registrant 160 may proceed with the registration process. If the domain name is not available for registration (or even if the domain name is available), the registrant 160 may keep selecting alternative domain names until an available domain name is found.

A current problem many domain name registrants 160 face is trying to find a domain name that is available. It is generally desirable to have a domain name that is a short word or phrase. These domain names are easier to remember and enter into a browser, thereby increasing the traffic to its associated website. Unfortunately, many people want the same short generic domain names making it difficult for registrants 160 to find a good domain name that is not already registered. The present invention addresses the problem of a registrant 160 trying to find a good available domain name.

A registrar 100 may be configured to allow each customer/registrant 160 to create a registrant customer account 110 so that the registrar 100 comprises a plurality of registrant customer accounts assigned to a plurality of registrants 160. Each registrant 160 may create a registrant customer account 110 with a registrar 100. As the registrar 100 will have a plurality of customers, i.e., registrants 160, the registrar 100 will manage a plurality of registrant customer accounts 110. Internet users/customers/registrants, other than the registrant 160 that owns or registered the registrant customer account 110, are not given access to the registrant customer accounts of other registrants, i.e., the registrant customer accounts are private to all except the registrant 160 that is associated with that specific registrant customer account 110.

Each registrant 160 from the webpages 112 of their registrant customer account 110 has access to the information for the domain name(s) registered to the registrant 160 with the registrar 100 as well as other products and services the registrant 160 may have purchased from the registrar 100. As non-limiting examples, a registrant customer account 110 may list 114 one or more domain names registered to the registrant 160 along with corresponding options to manage the domain names. Thus, each registrant 160 from the webpages 112 of their registrant customer account 110 may also manage their domain name(s) and other services purchased from the registrar 100. As non-limiting examples, each registrant 160 may renew domain names and/or edit DNS records 185 for the domain names registered to the registrant 160 through the registrar 100.

The registrar 100 has access to all of the stored information for the registrant customer accounts so that the registrar 100 may read, add, delete or edit information as the registrants 160 use their registrant customer accounts to manage their domain names and other products.

The illustrated example public webpage 118 in FIG. 2 allows a user to enter a search string or a domain name in the search field 202. The user may then select an option, such as, as a non-limiting example, a Search for Domain button 203 when the user is ready to see a list 116 of suggested domain names. After the user selects the Search for Domain button 203, the registrar 100 may generate domain names based on the search string or the domain name entered into the search field 202. After creating a list 116 of suggested domain names and checking the availability of the suggested domain names, the registrar 100 may display to the user the newly created suggested domain names that are available.

Other information may also be displayed on the public webpage 118, such as, as non-limiting examples, advertisements for various products 204 and general product descriptions 205 for products offered by the registrar 100. The public webpage 118 may also display a Sign In webpage button 201 that when selected starts the process of authenticating the registrant 160. Once the registrant 160 is authenticated, the registrant 160 may access the registrant customer account 110 that comprises a plurality of private webpages 112 that display private information to the registrant 160 and allow the registrant 160 to manage/control the domain names and possibly other services registered to the registrant 160.

FIG. 3 is an example webpage 118 for a registrant 160 to sign in or login to a registrant customer account 110. This webpage 118 may be used by a plurality of registrants 160 and the webpage 118 will, if a proper identification is provided, login each authenticated registrant 160 to that registrant's registrant customer account 110. In the illustrated non-limiting example in FIG. 3, the registrant 160 is asked to enter a username/customer #300 and a password 301.

Each registrant customer account 110 is preferably protected, such as by requiring the registrant 160 to be authenticated, i.e., identity verified, using, as a non-limiting example, a login credential authenticator 120. As non-limiting examples of authentication, the registrant 160 may be requested something the registrant 160 knows (such as a username 300 and a password 301 as illustrated in FIG. 3), something the registrant 160 has (such as a character string sent to the registrant's cell phone or a character string displayed on a portable toggle) and/or something the registrant 160 is (such as a biometric measurement of, e.g., a finger print, retina scan, and/or facial features, etc. measured by a biometric device). The registrar 100 may also track cookies on the registrant 160 client device 150, use any other desired means for authenticating the registrant 160 or some combination of these described authentication methods.

Figure 4:
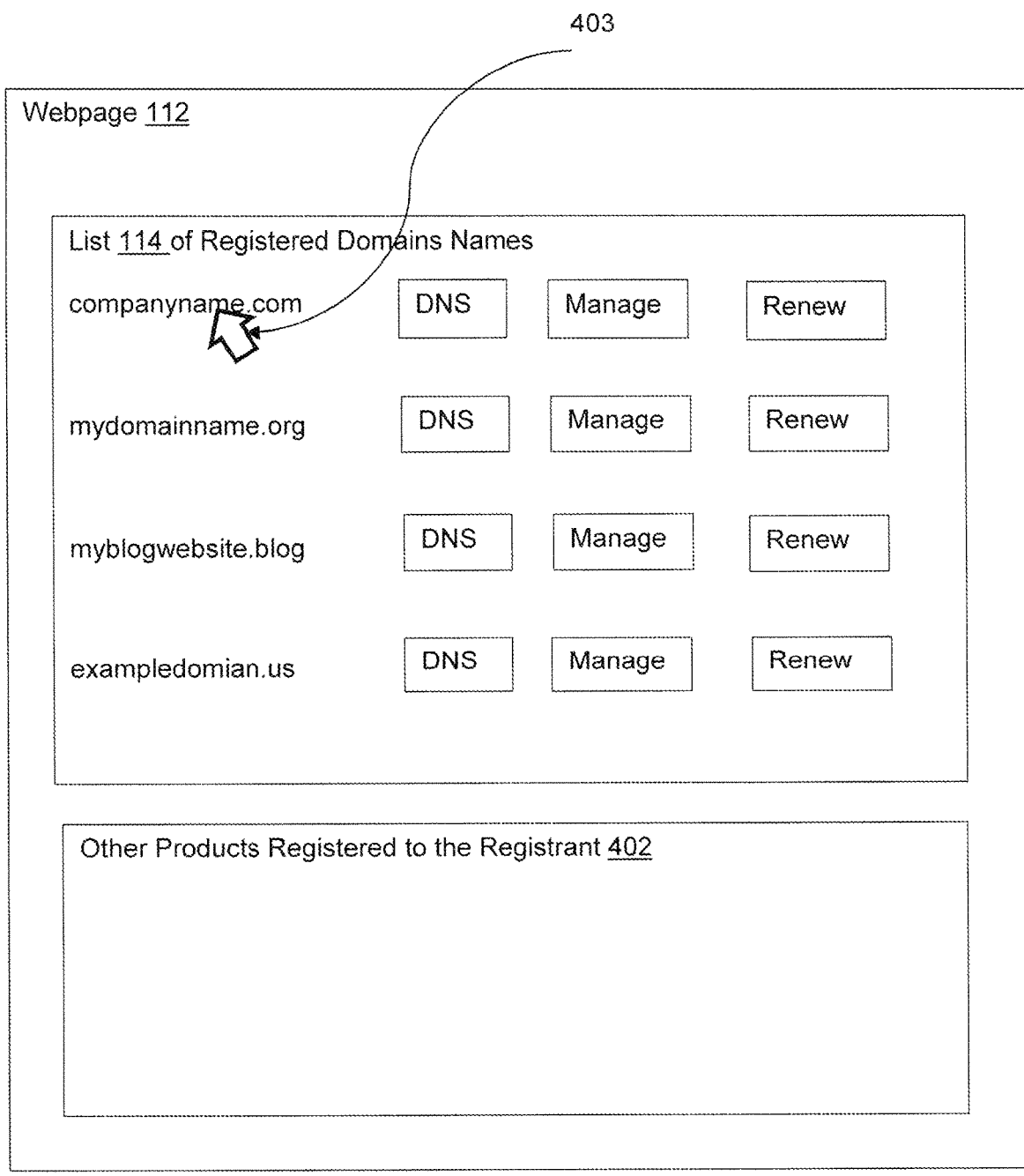
FIG. 4 is an example private webpage that may be one webpage in a plurality of webpages in a registrant customer account. The webpages, comprising data specific to the registrant, in the registrant customer account are only displayed to the owner/registrant of the registrant customer account after authentication, possibly via the webpage in FIG. 3. The webpages in the registrant customer account are not displayed to other customers/registrants of the registrar. The webpages in the registrant customer account may display information that is specific and private for the registrant and allow the registrant to manage one or more domain names and/or one or more services. The items managed, such as controlling the DNS of a domain name and/or renewing a domain name, may be items that are managed only by the registrant of the domain name.

FIG. 4 is an example private webpage 112 that may be one webpage 112 in a plurality of webpages in a registrant customer account 110. The webpages 112 in the registrant customer account 110 with private information and/or ability to manage domain names registered to the registrant 160 are only displayed to the owner/registrant 160 of the registrant customer account 110 after authentication of the registrant 160, possibly via the webpage 112 in FIG. 3. The webpages 112 in the registrant customer account 110 displaying private information and/or enabling control over domain names reserved for the registrant 160 of the domain names are not displayed to other Internet users or customers/registrants of the registrar 100. It should be appreciated that other registrants may have access to other registrant customer accounts that have similar webpages, most likely using the same webpage templates, graphics and generic text, but displaying private information and/or enabling control over domain names registered to the other registrants. Thus, each registrant in a plurality of registrants may have a private registrant customer account 110, with similar webpages, but with information and functions specific for that particular registrant.

The webpages 112 in the registrant customer account 110 display information that is specific and private for the registrant 160 and allow the registrant 160 to manage one or more domain names and/or one or more services registered to the registrant 160. The items managed, such as controlling the DNS of a domain name and/or renewing a domain name registered to the registrant 160, are actions that are managed/controlled only by the registrant 160 of the domain name and only in the registrant customer account 110. In FIG. 4, a cursor is hovering over the domain name "companyname.com" displayed on the example webpage 112.

Figure 5:
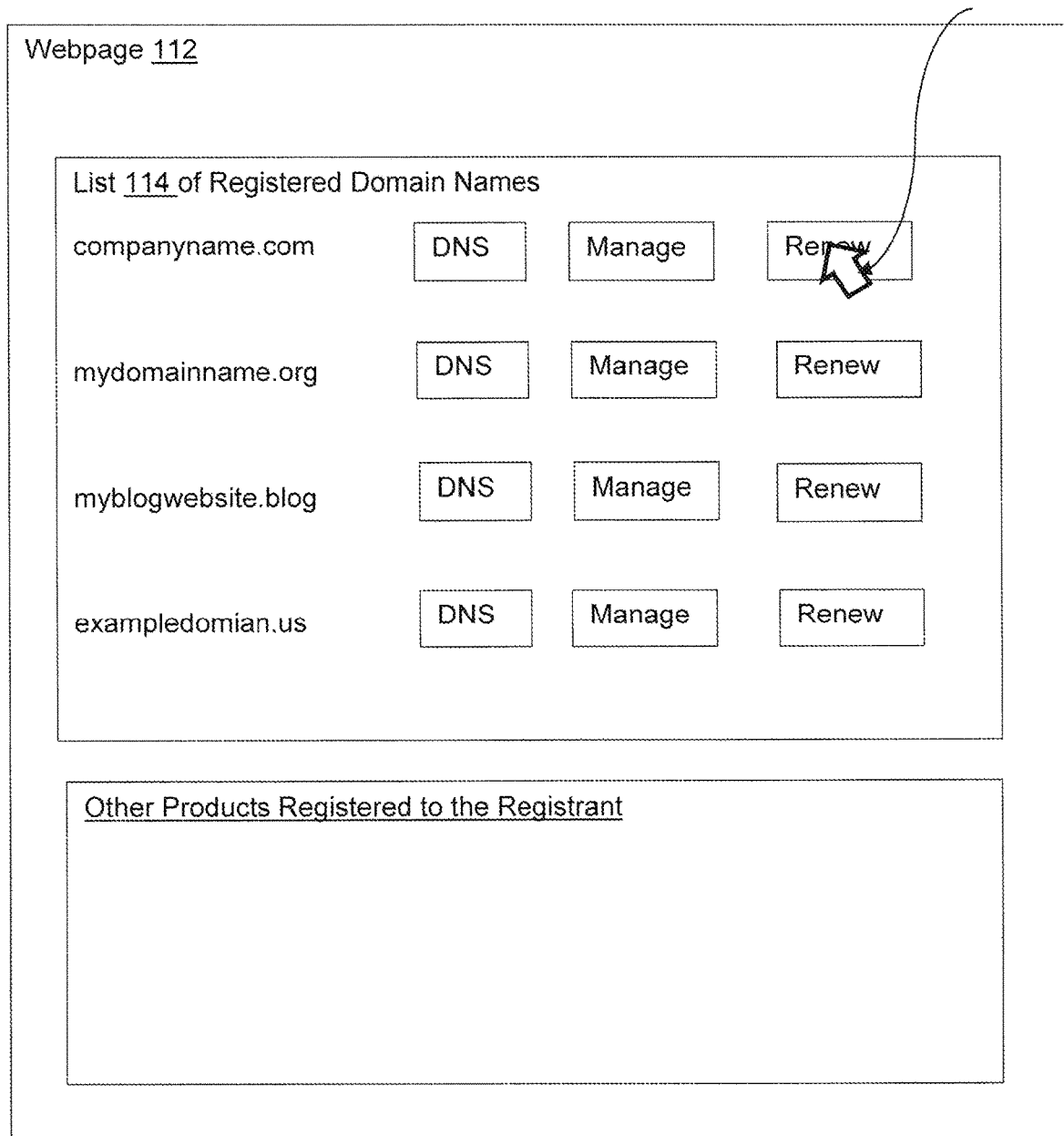
FIG. 5 is an example of the webpage of FIG. 4, however, the registrant has moved the cursor so as to hover the curser over an option for controlling the domain name "companyname.com." In the illustrated example, the option for controlling the domain name is to start the process of renewing (Renew) the domain name registered to the registrant.

FIG. 5 is an example of the webpage 112 of FIG. 4, however, the registrant 160 has moved the cursor so as to hover over an option for controlling the domain name "companyname.com" determined as the option for controlling the domain name is in the same row as the domain name. In the illustrated example, the option for controlling the domain name is to start the process of renewing (Renew) the domain name.

Figure 6:
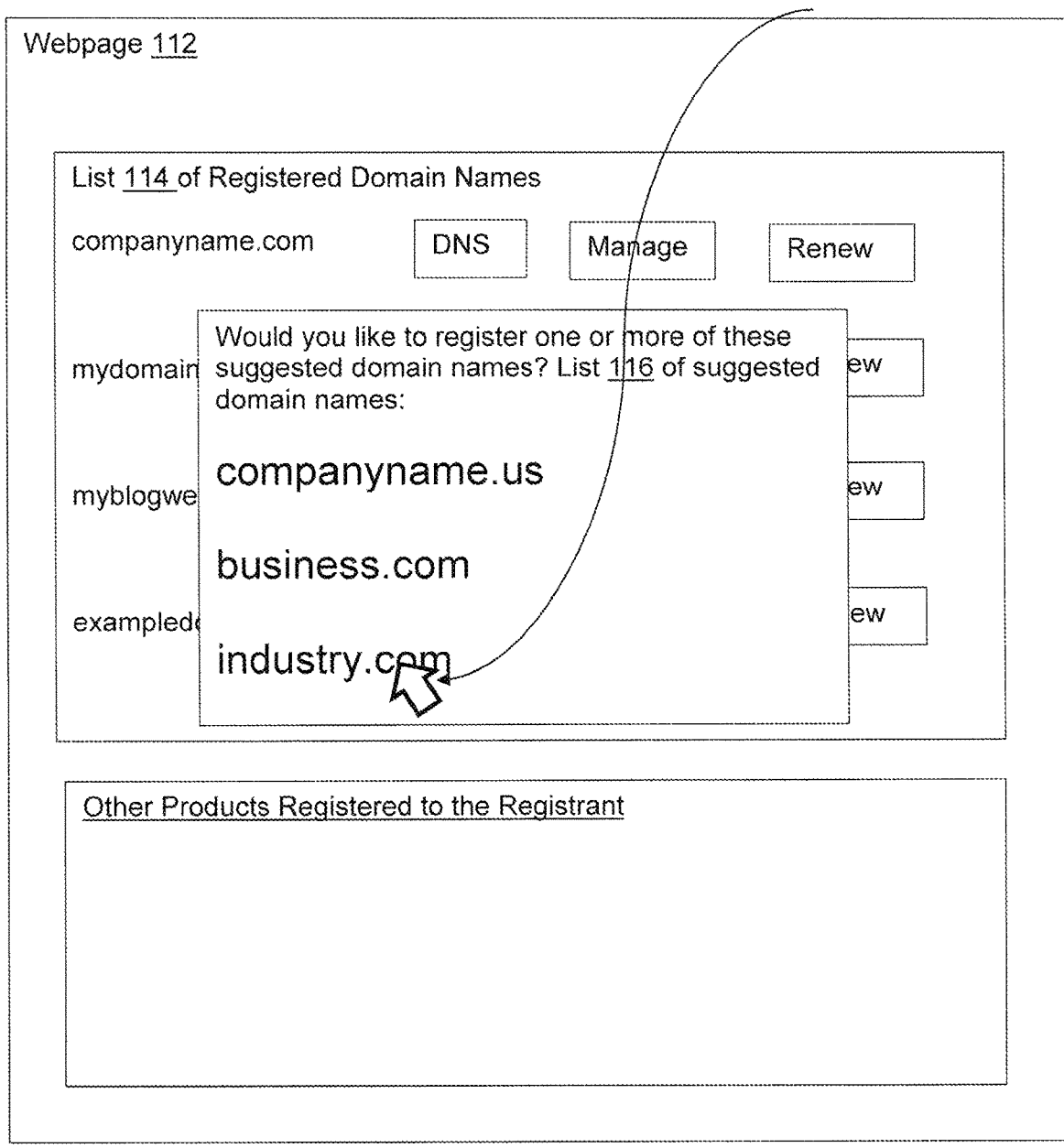
FIG. 6 is an example of the webpage in FIG. 4 after the registrar has detected an interest by the registrant in a domain name registered to the registrant. Based solely on the detection of interest, the registrar may display to the registrant (in this example in a pop-up window) one or more suggested domain names, i.e., "companyname.us," "business.com," and "industry.com" to the registrant for domain name registration.

FIG. 6 is an example of the webpage 112 in FIG. 4 after the registrant 160 has detect an interest in the registered domain name by the registrant 160 while the registrant 160 is logged into the registrant customer account 110. The interest in the registered domain name may be detected, as non-limiting examples, by the registrant 160 selecting: i) the registered domain name, ii) an option to renew the registered domain name and/or iii) an option to manage the registered domain name (such as reviewing and/or editing DNS records 185 for the registered domain name).

Alternatively, or in addition, the interest in the registered domain may be detected, as non-limiting examples, by the registrant 160 hovering a curser over: i) the registered domain name, ii) an option to renew the registered domain name and/or iii) an option to manage the registered domain name (such as reviewing and/or editing DNS records 185 for the registered domain name) for at least a predetermined period of time.

Hovering or hovering a curser over an item is hereby defined to mean that the curser has remained over the item on the webpage 112 for at least some preselected or predetermined period of time. As non-limiting examples, the curser may have to remain over an item at least 0.5 second, at least one second or at least three seconds to count has hovering. Of course, shorter or longer time periods may be preselected depending on the desired sensitivity of the system in detecting hovering. Shorter preselected time periods for hovering will create a more sensitive system and will detect hovering more often, while longer preselected time periods for hovering will create a less sensitive system and will detect hovering less often. The registrar 100 may select the preselected time period for detecting hovering and/or one or more registrants of the registrar 100 may select a desired time period or sensitivity of the system to detect hovering.

After detecting the interest in the registered domain name, the registrar 100 may display one or more suggested domain names (that preferably have previously been confirmed as available for registration) to the registrant 160, where the one or more suggested domain names are all based on or derived from the domain name that the registrar 100 detected the interest from the registrant 160. Other possible suggested domain names that are not based on or derived from the registered domain name are preferably not displayed to the registrant 160. In this manner, the registrar 100 may deduce that the registrant 160 has an interest in the one or more suggested domain names as they are all based on or derived from the registered domain name, which the registrar 100 has detected that the registrant 160 has a current interest.

In the non-limiting example illustrated in FIG. 6, the display of one or more suggested domain names is a pop-up window displaying the one or more suggested domain names, i.e., "companyname.us," "business.com," and "industry.com." While FIG. 6 illustrates the display of one or more suggested domain names as a pop-up window, the display of the one or more suggested domain names may take any form that displays the one or more suggested domain names to the registrant 160, such as displaying the domain names on a webpage 112 of the registrant customer account 110. The suggested domain names are displayed to the registrant 160 for domain name registration, even though the registrant 160 did not perform a traditional action for requesting suggested domain names, such as entering a search string or a desired domain name into a search field 202 designed to generate suggested domain names.

Figure 7:
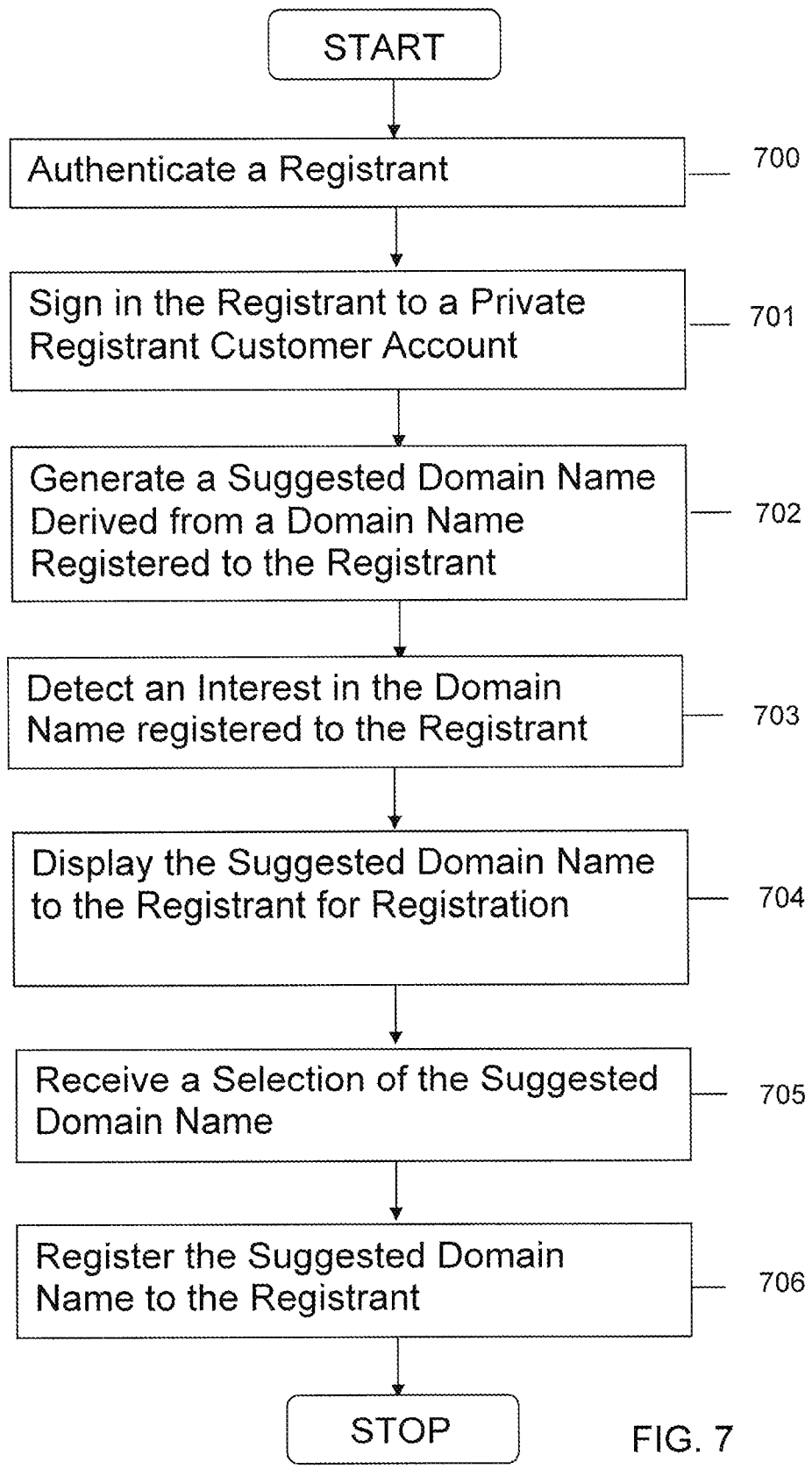
FIG. 7 is a flowchart of a method of practicing the invention.

FIG. 7 is a flowchart of an example method for a registrar 100 to generate, display and register a suggested domain name to a registrant 160, wherein the suggested domain names are based on or derived from a domain name registered to the registrant 160 that the registrar 100 has detected an interest in from the registrant 160. The registrar 100 may receive over a computer network login credentials from the registrant 160 using, as a non-limiting example, the webpage 112 illustrated in FIG. 2.

The registrar 100 may authenticate the login credentials from the registrant 160 by matching the login credentials from the registrant 160 with login credentials stored by the registrar 100 for the registrant 160 of the registrant customer account 110. If the login credentials from the registrant 160 do not match the stored login credentials for the registrant customer account 110, the registrant 160 is not logged in, i.e., not given access to the registrant customer account 110.

If the login credentials from the registrant 160 match the stored login credentials for the registrant customer account 110, (Step 700) the registrar 100 may login or sign in the registrant 160 into the registrant customer account 110 (Step 701). The registrant customer account 110 comprises one or more webpages 112. The one or more webpages 112 of the registrant customer account 110 are i) not accessible to other registrants of the registrar 100, ii) configured to display to the registrant 160 a plurality of settings for a registered domain name registered to the registrant 160, and iii) configured to allow the registrant 160 to modify the plurality of settings for the registered domain name.

At some time before or after the registrant 160 signs in/logs into the registrant customer account 110, the registrar 100, using a domain name generator 130, comprising computer hardware and software, may generate a domain name to suggest to the registrant 160 (suggested domain name) to register, based on or derived from a domain name registered to the registrant 160 (registered domain name). The registrar 100 may repeat this process to generate one or more suggested available domain names for each registered domain name registered to the registrant 160. The registrar 100 may further repeat this process for a plurality of registrants so that the registrar 100 has generated and is storing one or more suggested domain names for one or more other registered domain names for the other registrants of the registrar 100.

As a non-limiting example of generating a suggested domain name based on or derived from a registered domain name, the registrar 100 may take a second level domain from a registered domain name to the registrant 160 and append a different TLD to the second level domain to thereby create a new suggested domain name. As another non-limiting example of generating a suggested domain name based on or derived from a registered domain name, the registrar 100 may determine a synonym for the second level domain and replace the second level domain with the synonym to thereby create a new suggested domain name. As another non-limiting example of generating a suggested domain name based on or derived from a registered domain name, the registrar 100 may determine a synonym for a word that is within a second level domain and replace the word in the second level domain with the synonym to thereby create a new suggested domain name.

Any method of generating a suggested domain name may be used, as long as the suggested domain name is based on or derived from the registered domain name to the registrant 160 that the registrar 100 detected an interest in from the registrant 160 while the registrant 160 is signed into the registrant customer account 110. Thus, hovering over domain name A will not trigger a suggested domain name to be displayed based on or derived from domain name B, but hovering over domain name A will only trigger displaying one or more suggested domain names based on or derived from domain name A.

The registrar 100 may determine whether the new suggested domain name is available or not available for domain name registration. If the suggested domain name is not available for registration, the registrar 100 may discard the suggested domain name and/or save the suggested domain name in a black list of domain names that are not to be displayed to the registrant 160. On the other hand, if the suggested domain name is available for registration, the registrar 100 may save the suggested domain name, possibly in a database, to display to the registrant 160 upon or immediately after detecting an interest in the registered domain name upon which the suggested domain name is based on or derived from. (Step 702)

The registrar 100 may detect an interest in the registered domain name by the registrant 160 while the registrant 160 is logged into the registrant customer account 110. Any desired method of detecting the interest in the domain name already registered to the registrant 160 may be used. As non-limiting examples, the registrar 100 may detect that i) the registrant 160 selected the registered domain name, ii) selected an option to renew the registered domain name or iii) selected an option to manage the registered domain name. Alternatively, or in addition, the registrar 100 may detect that i) the registrant 160 hovered the curser over the registered domain name, ii) hovered the curser over an option to renew the registered domain name or iii) hovered the curser over an option to manage the registered domain name. (Step 703)

The registrar 100, triggered solely by the registrar 100 detecting the interest in the registered domain name by the registrant 160, while the registrant 160 is logged into the registrant customer account 110, may immediately, i.e., in real-time, display on a webpage 112 in the registrant customer account 110 the suggested domain names to the registrant 160 as an option for the registrant 160 to register one or more of the suggested domain names. (Step 704)

The triggered display of one or more suggested domain names is displayed to the registrant 160 without the registrant 160 taking any traditional actions indicating the registrant 160 wanted to be displayed one or more suggested domain names. Specifically, the triggered display of one or more suggested domain names (comprising one or more available domain names for registration) is displayed to the registrant 160 even though the registrant 160 has not entered a search string or domain name into a search field 202 used for generating suggested domain names to determine if a domain name is available.

The registrar 100 might not receive a selection from the registrant 160 in which case none of the suggested domain names are registered to the registrant 160. If the registrant 160 does not select a suggested domain name that was displayed for registration, the registrar 100 may i) save the suggested domain name in a black list and not display the same suggested domain name to the registrant 160 again, ii) increase the predetermined time period necessary to detect hovering, iii) ask the registrant 160 if the registrant 160 wants suggested domain names to be displayed to the registrant 160 while the registrant 160 is signed into the registrant customer account 110 and/or iv) turn off the suggested domain name feature for some predetermined period of time, such as one day.

Alternatively, the registrar 100 may receive from the registrant 160 a selection of one or more of the suggested domain names displayed on the one or more webpages 112 of the registrant customer account 110 to register one or more of the suggested domain names. (Step 705) The registrar 100 may receive from the registrant 160 a selection of one or more of the suggested domain names displayed on the one or more webpages 112 of the registrant customer account 110 to register the one or more selected suggested domain name(s). As a non-limiting example in FIG. 6, the curser is hovering over the suggested domain name "industry.com" allowing the user to click on that suggested domain name indicating that the registrant 160 desires to register the domain name "industry.com." (Step 705)

The registrar 100 may collect a domain name registration fee and register any of the suggested domain names selected by the registrant 160 to the registrant 160. As the registrant 160 has already been authenticated and is signed into the registrant customer account 110, the registrar 100 may use the information previously provided in creating the registrant customer account 110 in registering the one or more selected domain name to the registrant 160. The registrar 100 may register the suggested domain name to the registrant 160 by transmitting the suggested domain name to a registry 170 with a registration request, which stores the suggested domain name (now a registered domain name) in the WHOIS database 175. (Step 706)

The registrar 100 may also create new suggested domain names based on or derived from the newly registered suggested domain name, and display the new suggested domain names if, and when, the registrant 160 shows an interest in the registered suggested domain name.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method for a registrar to generate, display and register a suggested domain name to a registrant, comprising the steps of:
   generating by the registrar the suggested domain name based off of and derived from a registered domain name registered to the registrant;
   receiving by the registrar over a computer network login credentials from the registrant;

authenticating by the registrar the login credentials from the registrant;

logging the registrant into a registrant customer account comprising one or more webpages, wherein the one or more webpages of the registrant customer account are configured to display and allow the registrant to modify a plurality of settings for the registered domain name and the one or more webpages of the registrant customer account are not accessible to other registrants of the registrar;

determining by the registrar the suggested domain name is available for registration and upon determining the suggested domain name is available for registration saving the suggested domain name in a database;

detecting by the registrar an interest in the registered domain name by the registrant while the registrant is logged into the registrant customer account, wherein the detecting consists of i) detecting the registrant selected the registered domain name, selected an option to renew the registered domain name or selected an option to manage the registered domain name and ii) detecting the registrant hovered the curser over the registered domain name, hovered the curser over an option to renew the registered domain name or hovered the curser over an option to manage the registered domain name;

detecting the interest either by i) detecting the registrant selected the registered domain name, selected an option to renew the registered domain name or selected an option to manage the registered domain name or ii) detecting the registrant hovered the curser over the registered domain name, hovered the curser over an option to renew the registered domain name or hovered the curser over an option to manage the registered domain name;

triggered solely by the registrar detecting the interest in the registered domain name by the registrant while the registrant is logged into the registrant customer account, immediately displaying on a webpage in the registrant customer account the suggested domain name to the registrant as an option to the registrant to register the suggested domain name;

receiving by the registrar from the registrant a selection of the suggested domain name displayed on the webpage in the registrant customer account to register the suggested domain name; and registering by the registrar the suggested domain name to the registrant, wherein the suggested domain name is transmitted to a registry and stored in the WHOIS database.

2. The method of claim 1, wherein the registrar comprises a plurality of registrant customer accounts, wherein each registrant customer account in the plurality of registrant customer accounts comprises one or more webpages accessible by one of the other registrants of the registrar.

3. The method of claim 1, wherein the one or more webpages of the registrant customer account are configured to allow the registrant to renew the registered domain name.

4. The method of claim 1, wherein the one or more webpages of the registrant customer account are configured to allow the registrant to edit DNS records of the registered domain name.

5. The method of claim 1, wherein the registrant does not enter a search term or a domain name into a field on a webpage in order for the registrar to display the suggested domain name on the webpage of the registrant customer account to the registrant for registration of the suggested domain name.

6. The method of claim 1, wherein the generating by the registrar the suggested domain name based off of and derived from the registered domain name registered to the registrant comprises the step of replacing a TLD of the registered domain name with a different TLD to generate the suggested domain name.

7. The method of claim 1, wherein the generating by the registrar the suggested domain name based off of and derived from a registered domain name registered to the registrant comprises the steps of:
determining by the registrar a synonym for a second level domain of the registered domain name; and
replacing the second level domain of the registered domain name with the synonym for the second level domain to generate the suggested domain name.

8. The method of claim 1, wherein the generating by the registrar the suggested domain name based off of and derived from a registered domain name registered to the registrant comprises the steps of:
determining by the registrar a synonym for a word in a second level domain of the registered domain name; and
replacing the word in the second level domain of the registered domain name with the synonym for the word in the second level domain to generate the suggested domain name.

9. A method for a registrar to generate, display and register a suggested domain name to a registrant, comprising the steps of:
generating by the registrar the suggested domain name based off of and derived from a registered domain name registered to the registrant;
logging the registrant into a registrant customer account comprising one or more webpages, wherein the one or more webpages of the registrant customer account are:
i) configured to display and allow the registrant to modify a plurality of settings for the registered domain name and
ii) not accessible to other registrants of the registrar;
determining by the registrar the suggested domain name is available for registration and upon determining the suggested domain name is available for registration saving the suggested domain name in a database;
detecting by the registrar an interest in the registered domain name by the registrant while the registrant is logged into the registrant customer account, wherein the detecting consists of i) detecting the registrant hovered a curser over the registered domain name, hovered the curser over an option to renew the registered domain name or hovered the curser over an option to manage the registered domain name and ii) detecting the registrant hovered the curser over the registered domain name, hovered the curser over an option to renew the registered domain name or hovered the curser over an option to manage the registered domain name;
detecting the interest either by i) detecting the registrant selected the registered domain name, selected an option to renew the registered domain name or selected an option to manage the registered domain name or ii) detecting the registrant hovered the curser over the registered domain name, hovered the curser over an option to renew the registered domain name or hovered the curser over an option to manage the registered domain name;

triggered solely by the registrar detecting the interest in the registered domain name by the registrant while the registrant is logged into the registrant customer account, immediately displaying on a webpage in the registrant customer account the suggested domain name to the registrant as an option to the registrant to register the suggested domain name;

receiving by the registrar from the registrant a selection of the suggested domain name displayed on the webpage in the registrant customer account to register the suggested domain name; and registering by the registrar the suggested domain name to the registrant, wherein the suggested domain name is transmitted to a registry and stored in the WHOIS database.

10. The method of claim 9, wherein the registrar comprises a plurality of registrant customer accounts, wherein each registrant customer account in the plurality of registrant customer accounts comprises one or more webpages accessible by one of the other registrants of the registrar.

11. The method of claim 9, wherein the one or more webpages of the registrant customer account are configured to allow the registrant to renew the registered domain name.

12. The method of claim 9, wherein the one or more webpages of the registrant customer account are configured to allow the registrant to edit DNS records of the registered domain name.

13. The method of claim 9, wherein the generating by the registrar the suggested domain name based off of and derived from the registered domain name registered to the registrant comprises the step of replacing a TLD of the registered domain name with a different TLD to generate the suggested domain name.

14. The method of claim 9, wherein the generating by the registrar the suggested domain name based off of and derived from a registered domain name registered to the registrant comprises the steps of:
  determining by the registrar a synonym for a second level domain of the registered domain name; and
  replacing the second level domain of the registered domain name with the synonym for the second level domain to generate the suggested domain name.

15. A method for a registrar to generate, display and register a suggested domain name to a registrant, comprising the steps of:
  generating by the registrar the suggested domain name based off of and derived from a registered domain name registered to the registrant;
  logging the registrant into a registrant customer account comprising one or more webpages, wherein the one or more webpages of the registrant customer account are:
    i) configured to display and allow the registrant to modify a plurality of settings for the registered domain name and
    ii) not accessible to other registrants of the registrar;
  determining by the registrar the suggested domain name is available for registration and upon determining the suggested domain name is available for registration saving the suggested domain name in a database;
  detecting by the registrar an interest in the registered domain name by the registrant while the registrant is logged into the registrant customer account, wherein the detecting consists of i) detecting the registrant selected the registered domain name, selected an option to renew the registered domain name or selected an option to manage the registered domain name and ii) detecting the registrant hovered the curser over the registered domain name, hovered the curser over an option to renew the registered domain name or hovered the curser over an option to manage the registered domain name;
  detecting the interest either by i) detecting the registrant selected the registered domain name, selected an option to renew the registered domain name or selected an option to manage the registered domain name or ii) detecting the registrant hovered the curser over the registered domain name, hovered the curser over an option to renew the registered domain name or hovered the curser over an option to manage the registered domain name;
  triggered solely by the registrar detecting the interest in the registered domain name by the registrant while the registrant is logged into the registrant customer account, immediately displaying on a webpage in the registrant customer account the suggested domain name to the registrant as an option to the registrant to register the suggested domain name;
  receiving by the registrar from the registrant a selection of the suggested domain name displayed on the webpage in the registrant customer account to register the suggested domain name; and
  registering by the registrar the suggested domain name to the registrant, wherein the suggested domain name is transmitted to a registry and stored in the WHOIS database.

16. The method of claim 15, wherein the registrar comprises a plurality of registrant customer accounts, wherein each registrant customer account in the plurality of registrant customer accounts comprises one or more webpages accessible by only one of the other registrants of the registrar.

17. The method of claim 15, wherein the one or more webpages of the registrant customer account are configured to allow the registrant to renew the registered domain name.

18. The method of claim 15, wherein the one or more webpages of the registrant customer account are configured to allow the registrant to edit DNS records of the registered domain name.

19. The method of claim 15, wherein the generating by the registrar the suggested domain name based off of and derived from the registered domain name registered to the registrant comprises the step of replacing a TLD of the registered domain name with a different TLD to generate the suggested domain name.

20. The method of claim 15, wherein the generating by the registrar the suggested domain name based off of and derived from a registered domain name registered to the registrant comprises the steps of:
  determining by the registrar a synonym for a second level domain of the registered domain name; and
  replacing the second level domain of the registered domain name with the synonym for the second level domain to generate the suggested domain name.

* * * * *